US012802206B2

(12) United States Patent
Yan et al.

(10) Patent No.: US 12,802,206 B2
(45) Date of Patent: Nov. 17, 2026

(54) RECORDING MEDIUM, PARAMETER DETERMINATION DEVICE, AND PARAMETER DETERMINATION METHOD

(71) Applicant: Mitsubishi Electric Corporation, Tokyo (JP)

(72) Inventors: Yiguo Yan, Tokyo (JP); Yasuaki Susumu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 350 days.

(21) Appl. No.: 18/575,317

(22) PCT Filed: Nov. 30, 2021

(86) PCT No.: PCT/JP2021/043976
§ 371 (c)(1),
(2) Date: Dec. 29, 2023

(87) PCT Pub. No.: WO2023/100269
PCT Pub. Date: Jun. 8, 2023

(65) Prior Publication Data
US 2024/0354933 A1 Oct. 24, 2024

(51) Int. Cl.

| | |
|---|---|
| ***G06T 7/00*** | (2017.01) |
| ***G06T 7/11*** | (2017.01) |
| ***G06T 7/246*** | (2017.01) |
| ***G06T 7/60*** | (2017.01) |
| ***G06V 10/26*** | (2022.01) |
| ***G06V 10/764*** | (2022.01) |
| ***G06V 20/50*** | (2022.01) |

(52) U.S. Cl.
CPC ................ *G06T 7/001* (2013.01); *G06T 7/11* (2017.01); *G06T 7/248* (2017.01); *G06T 7/60* (2013.01); *G06V 10/26* (2022.01); *G06V 10/764* (2022.01); *G06V 20/50* (2022.01); *G06T 2207/10016* (2013.01); *G06T 2207/30164* (2013.01); *G06V 2201/06* (2022.01)

(58) Field of Classification Search
None
See application file for complete search history.

(56) References Cited

U.S. PATENT DOCUMENTS

2014/0247876 A1* 9/2014 Moriya ................ H04N 19/436 375/240.23
2023/0111754 A1* 4/2023 Jones .................. G06F 18/2148 382/141

FOREIGN PATENT DOCUMENTS

JP 2013-191185 A 9/2013

OTHER PUBLICATIONS

International Search Report and Written Opinion mailed on Feb. 22, 2022, received for PCT Application PCT/JP2021/043976, filed on Nov. 30, 2021, 8 pages including English Translation.

* cited by examiner

*Primary Examiner* — Dov Popovici
(74) *Attorney, Agent, or Firm* — XSENSUS LLP

(57) ABSTRACT

A program causes an abnormality detection device to function as an acquirer to acquire continuous image data indicating images continuously captured, and a parameter determiner to determine, based on the continuous image data, parameters for dividing the continuous image data in at least one of a width direction or a height direction of the images and in a time direction.

12 Claims, 18 Drawing Sheets

RECORDING MEDIUM, PARAMETER DETERMINATION DEVICE, AND PARAMETER DETERMINATION METHOD

CROSS-REFERENCE TO RELATED APPLICATION

This application is a national stage application, filed under 35 U.S.C. § 371, of International Patent Application No. PCT/JP2021/043976, filed Nov. 30, 2021, the entire contents of which are incorporated herein by reference.

TECHNICAL FIELD

The present disclosure relates to an abnormality detection program, an abnormality detection device, and an abnormality detection method.

BACKGROUND ART

Factory automation (FA) sites usually use monitoring for any abnormality in controlling devices (see, for example, Patent Literature 1). Patent Literature 1 describes a technique for detecting abnormalities in detection targets, such as production line devices or facilities, based on image data acquired by continuously capturing the detection targets. With this technique, each image is mesh-divided into multiple blocks, and features extracted from each block are used to detect any abnormalities. The technique allows abnormalities in detection targets such as production line devices or facilities to be detected based on image data as abnormalities other than whether products are acceptable or defective.

CITATION LIST

Patent Literature

Patent Literature 1: Unexamined Japanese Patent Application Publication No. 2013-191185

SUMMARY OF INVENTION

Technical Problem

With the technique described in Patent Literature 1, a user sets, as a parameter, the size of each block into which the image is to be divided. Thus, an unknowledgeable or inexperienced user may set an inappropriate size of each block that may not allow accurate detection of abnormalities. A knowledgeable or experienced user may not set an appropriate size of each block when the capturing situation changes. In either case, setting such parameters for devices detecting abnormalities based on images involves the heavy workload of determining an appropriate block size through trial and error.

In response to the above issue, an objective of the present disclosure is to reduce the workload of setting parameters for devices detecting abnormalities based on images.

Solution to Problem

To achieve the above objective, an abnormality detection program according to an aspect of the present disclosure is a program for causing a computer to function as acquisition means for acquiring continuous image data indicating images continuously captured, parameter-determination means for determining, based on the continuous image data, parameters for dividing the continuous image data in at least one of a width direction or a height direction of the images and in a time direction, feature calculation means for calculating a first feature for each of pieces of patch data resulting from division of the continuous image data using the parameters determined by the parameter-determination means, and detection means for detecting, based on a comparison between the first feature calculated by the feature calculation means and a reference value, an abnormality in a capturing target captured in the images.

Advantageous Effects of Invention

In the structure according to the above aspect of the present disclosure, the parameter-determination means determines, based on the continuous image data, the parameters for dividing the continuous image data in at least one of the width direction or the height direction of the images and in the time direction. This eliminates the user operation of determining parameters for dividing the continuous image data through trial and error. Thus, the user has a less workload of setting parameters for devices detecting abnormalities based on images.

DESCRIPTION OF EMBODIMENTS

An abnormality detection device for executing an abnormality detection program according to one or more embodiments of the present disclosure is described below in detail with reference to the drawings.

Embodiment 1

Figure 1:
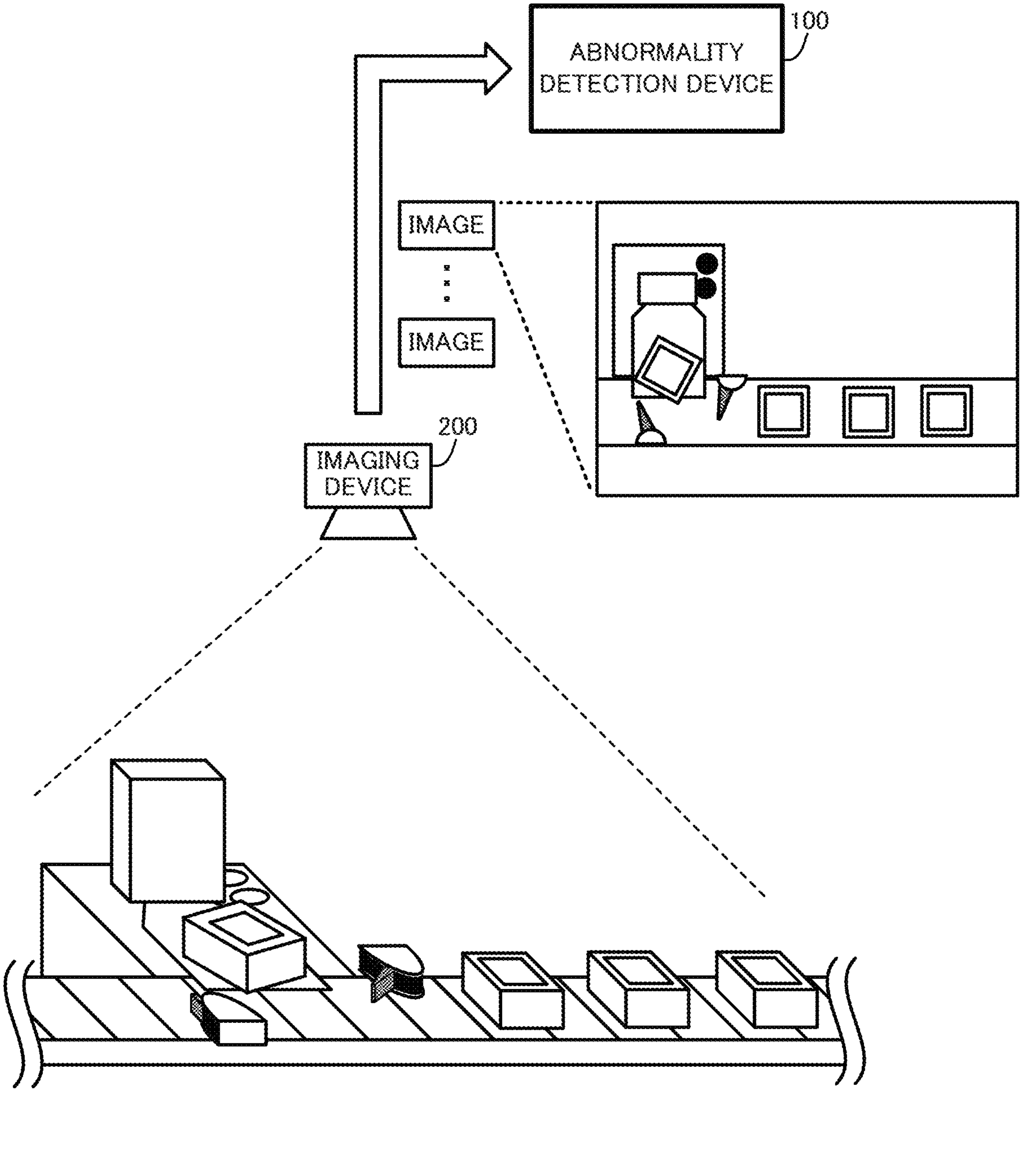
FIG. 1 is a diagram of a system including an abnormality detection device according to Embodiment 1 and an imaging device.

As illustrated in FIG. 1, an abnormality detection device 100 according to the present embodiment acquires images continuously captured by an imaging device 200 at a factory, and detects an abnormality based on a series of such images. Each of the abnormality detection device 100 and the imaging device 200 is an industrial personal computer (PC) located at the factory being a capturing target. The abnormality detection device 100 is not limited to such an industrial PC. The abnormality detection device 100 may be a control device, such as a programmable logic controller (PLC), or another FA device located at the factory. The abnormality detection device 100 may also be a management computer or a server device located external to the factory.

The abnormality detection device 100 is connected to the imaging device 200 with a communication path, through which image data can be transmitted. The communication path may be, for example, a dedicated communication line, an industrial or general information network installed at the factory, or a communication network such as the Internet. The communication path may be used for wired or wireless communication.

The target to be captured by the imaging device 200 is a section inside the factory. In the example of FIG. 1, the capturing target includes a belt conveyor, a workpiece conveyed on the belt conveyor, a robot arm for controlling conveyance of workpieces, and an inspection machine together with an inspection table for inspecting workpieces. The imaging device 200 with the adjusted angle of view is fixed immediately above the capturing target. The imaging device 200 periodically captures images of the capturing target immediately below, and sequentially transmits the images to the abnormality detection device 100. In some embodiments, the imaging device 200 may capture images outside the factory. For example, the imaging device 200 may be an external monitoring camera for capturing an entrance and an exit of the factory or capturing a control room outside the factory to manage the factory operating state.

An abnormality detected based on images indicates that the capturing target is beyond the operating state expected to be normal by a person involved in the management of the factory. Examples of an abnormality include damage to a workpiece and breakdown of a belt conveyor, a robot arm, or an inspection machine. Examples of a person involved include a manager, an operator, and a worker at the factory, or include a manufacturer of a FA device such as a robot arm or an inspection machine.

Figure 2:
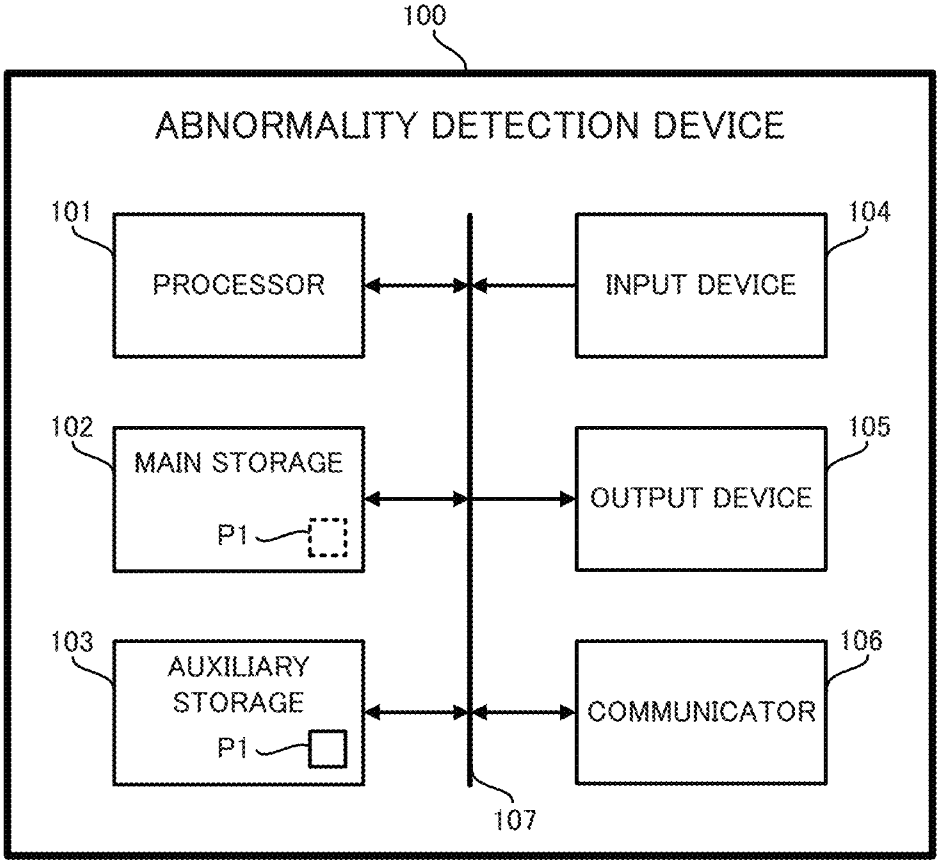
FIG. 2 is a block diagram of the abnormality detection device according to Embodiment 1, illustrating the hardware configuration.

FIG. 2 is a block diagram of the abnormality detection device 100, illustrating the hardware configuration. As illustrated in FIG. 2, the abnormality detection device 100 is a computer including a processor 101, a main storage 102, an auxiliary storage 103, an input device 104, an output device 105, and a communicator 106. The main storage 102, the auxiliary storage 103, the input device 104, the output device 105, and the communicator 106 are connected to the processor 101 with an internal bus 107.

The processor 101 includes an integrated circuit such as a central processing unit (CPU) or a micro processing unit (MPU). The processor 101 executes a program P1 stored in the auxiliary storage 103 to implement various functions to perform the processes described below. The program P1 corresponds to an example of an abnormality detection program.

The main storage 102 includes a random-access memory (RAM). The program P1 is loaded into the main storage 102 from the auxiliary storage 103. The main storage 102 is used as a work area for the processor 101.

The auxiliary storage 103 includes a nonvolatile memory, such as an electrically erasable programmable read-only memory (EEPROM) and a hard disk drive (HDD). In addition to the program P1, the auxiliary storage 103 stores various types of data used in processing performed by the processor 101. The auxiliary storage 103 provides data used by the processor 101 to the processor 101 as instructed by the processor 101. The auxiliary storage 103 stores data provided from the processor 101.

The input device 104 includes, for example, a hardware switch, an input key, a keyboard, or a pointing device. The input device 104 acquires information input by the user of the abnormality detection device 100 and provides the acquired information to the processor 101.

The output device 105 includes, for example, a display device such as a light emitting diode (LED) or a liquid crystal display (LCD), a buzzer, or a speaker. The output device 105 provides various types of information to the user as instructed by the processor 101.

The communicator 106 includes an interface circuit for communicating with external devices. The communicator 106 receives signals from the external devices and outputs data indicated by these signals to the processor 101. The communicator 106 may transmit signals indicating data output from the processor 101 to the external devices.

With cooperation of the above hardware components, the abnormality detection device 100 divides continuous image data as time-series images into multiple pieces of patch data, and detects any abnormality in each piece of patch data. An overview of division of the continuous image data performed by the abnormality detection device 100 is described with reference to FIG. 3.

Figure 3:
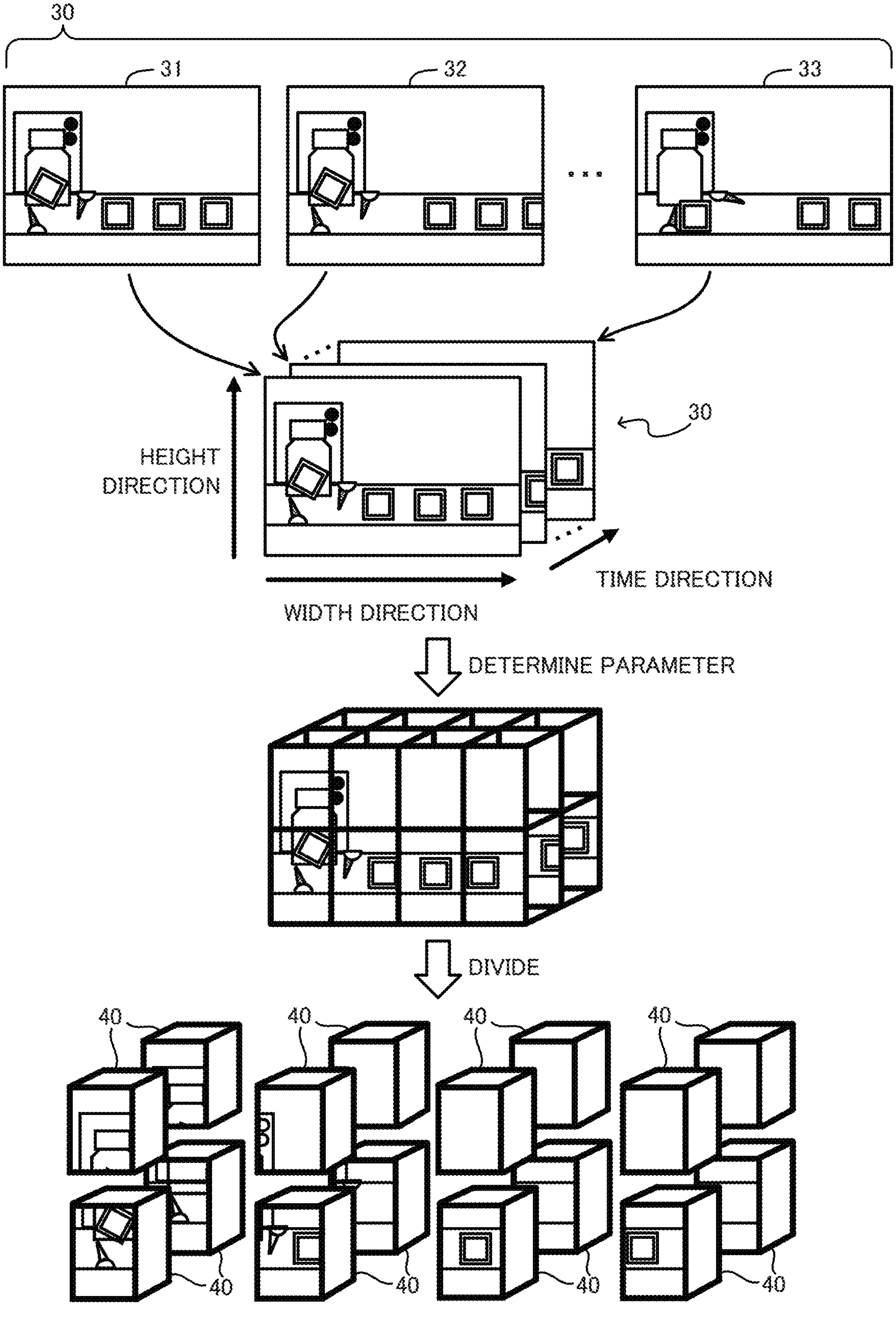
FIG. 3 is a schematic diagram illustrating division of continuous image data performed by the abnormality detection device according to Embodiment 1.

As illustrated in FIG. 3, a series of image data pieces, including images 31, 32, and 33 continuously captured, is collectively referred to as continuous image data 30. Each of the images 31 to 33 is a rectangular image having a width and a height. The images 31 to 33 are arranged in chronological order to correspond to the continuous image data 30 as three-dimensional data having lengths in a width direction, a height direction, and a time direction.

To divide the continuous image data 30 in the width direction and the height direction of the images 31 to 33, and the time direction, parameters are determined. In the example of FIG. 3, the parameters are determined to divide the continuous image data 30 into four pieces in the width direction, two pieces in the height direction, and two pieces in the time direction. The parameters indicate the length of each piece of patch data 40 in the width direction, the height direction, and the time direction.

For example, with the width of each of the images 31 to 33 in FIG. 3 being 960 pixels, the parameter indicating the width of each patch data piece 40 has a value determined as 240 pixels. Similarly, with the height of each of the images 31 to 33 being 720 pixels, the parameter indicating the height of each patch data piece 40 has a value determined as 360 pixels. With the length of the continuous image data 30 in the time direction being 240 frames, the parameter indicating the length of each patch data piece 40 in the time direction has a value determined as 120 frames. In some embodiments, the length of each patch data piece 40 in the time direction may be indicated in units of milliseconds.

Similarly to the continuous image data 30, each patch data piece 40 resulting from division of the continuous image data 30 is three-dimensional data, being smaller than the continuous image data 30 in any of the width direction, the height direction, and the time direction.

Figure 4:
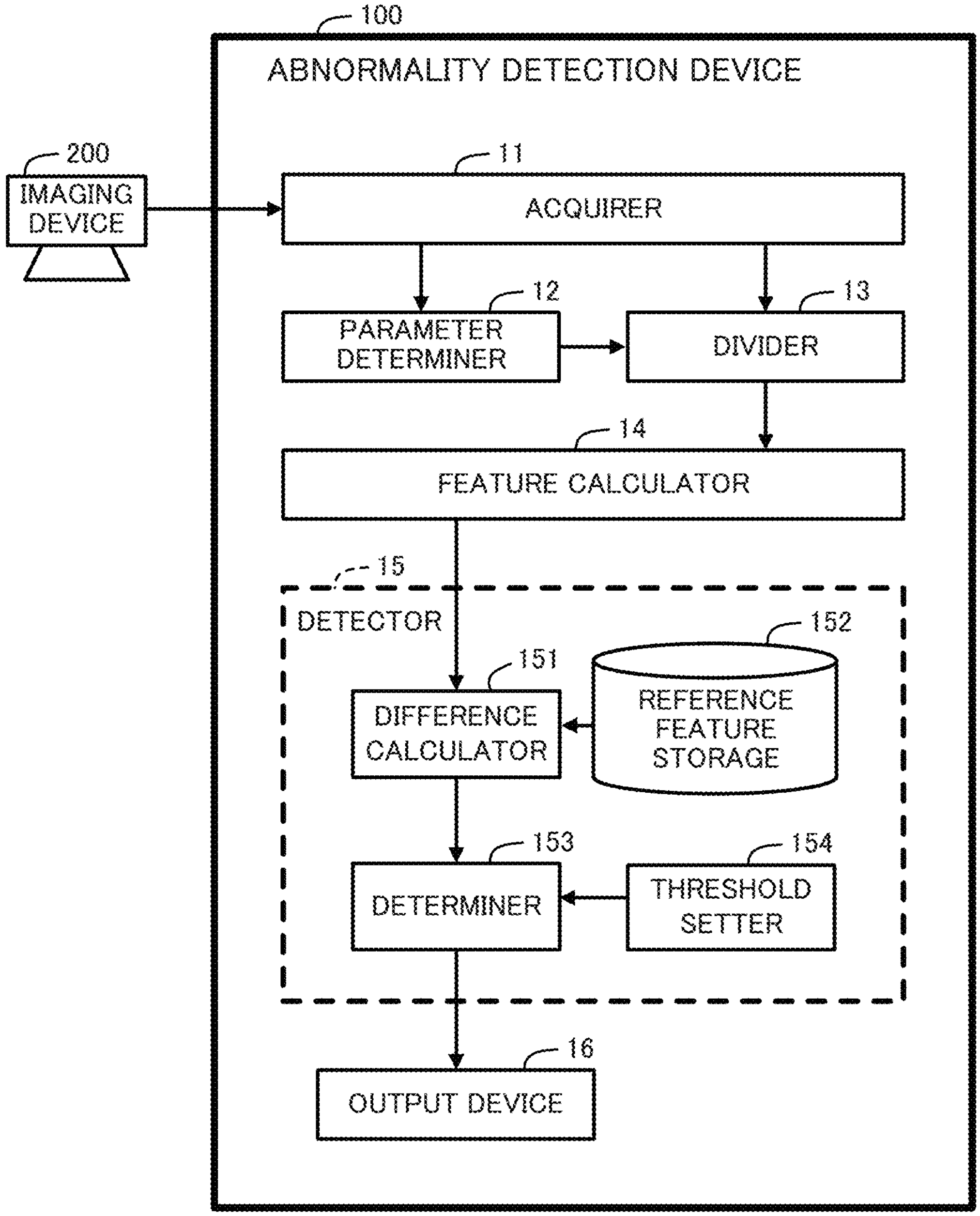
FIG. 4 is a functional block diagram of the abnormality detection device according to Embodiment 1.

The abnormality detection device 100 has the function of dividing the continuous image data as illustrated in FIG. 3, and the function of detecting an abnormality based on each patch data piece resulting from division of the continuous image data. More specifically, to perform the functions, as illustrated in FIG. 4, the abnormality detection device 100 includes an acquirer 11 for acquiring the continuous image data from the imaging device 200, a parameter determiner 12 for determining, based on the continuous image data, the parameters for dividing the continuous image data, a divider 13 for dividing the continuous image data using the determined parameters, a feature calculator 14 for calculating a feature for each patch data piece resulting from division of the continuous image data, a detector 15 for detecting an abnormality using the calculated feature, and an output device 16 for externally outputting a result of abnormality detection.

The acquirer 11 is mainly implemented by the processor 101, the main storage 102, and the communicator 106 operating in cooperation with each other. The acquirer 11 receives, from the imaging device 200, the continuous image data indicating images continuously captured by the imaging device 200, and outputs the received continuous image data to the parameter determiner 12 and the divider 13. The continuous image data acquired by the acquirer 11 may be a single block of data, a set of image data indicating images transmitted sequentially from the imaging device 200, or video data transmitted in a streaming format from the imaging device 200. The acquirer 11 may also resize the images or remove noise as appropriate. The acquirer 11 in the abnormality detection device 100 corresponds to an example of acquisition means for acquiring continuous image data.

The parameter determiner 12 is mainly implemented by the processor 101 and the main storage 102 operating in cooperation with each other. The parameter determiner 12 determines the values of the parameters, each indicating the size of each patch data piece in the width direction, the height direction, or the time direction, based on information indicated by the continuous image data. The size of each patch data piece in the width direction or the height direction is referred to as a patch size, and the length of each patch data piece in the time direction is referred to as a patch time length.

The patch size is determined as a rectangular area including the smallest blob area selected from the blob areas detected by comparing the image feature for each image in the continuous image data with a threshold. Examples of the image feature include at least one of a pixel value, gradient, an optical flow, or a histogram of oriented gradients (HOG) feature.

Figure 5:
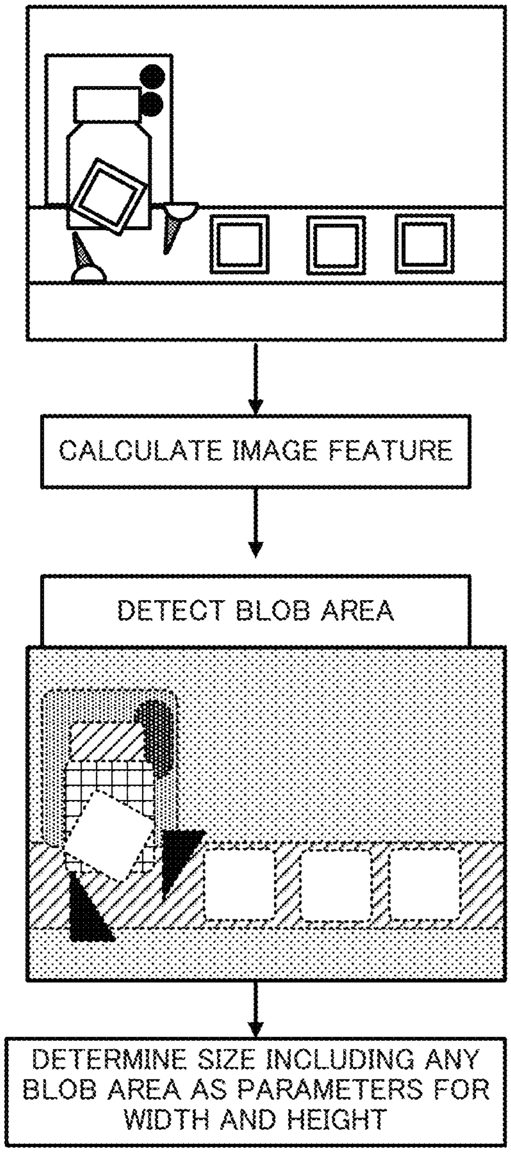
FIG. 5 is a diagram illustrating determination of a patch size in Embodiment 1.

More specifically, as illustrated in FIG. 5, the parameter determiner 12 calculates, in each image included in the continuous image data, the image feature for each partial area included in the corresponding image. The partial area may be a single pixel or a cell including multiple adjacent pixels. The parameter determiner 12 detects the blob area as a set of adjacent partial areas having similar image features. The similar image features are detected using a predetermined threshold. Detecting the similar image features can correspond to classification of the image features and thus may be performed by clustering the image features. The parameter determiner 12 determines the patch size to be circumscribed around the size of the smallest blob area selected from the detected blob areas in each image. Instead of using the smallest blob area, the patch size may be determined based on the blob area corresponding to the lower tenth percentile of the blob areas arranged in descending order from the largest area. Further, the patch size may be determined to be the size of the smallest blob area for which a margin is set.

The image feature corresponds to an example of a second feature. The parameter determiner 12 corresponds to an example of parameter-determination means for calculating a second feature for each of partial areas included in the images, classifying the second feature to detect blob areas each being a set of adjacent partial areas of the partial areas each having the second feature classified into an identical group, and determining the parameters indicating a width and a height of each of the pieces of patch data such that the piece of patch data includes a blob area selected from the detected blob areas.

Figure 6:
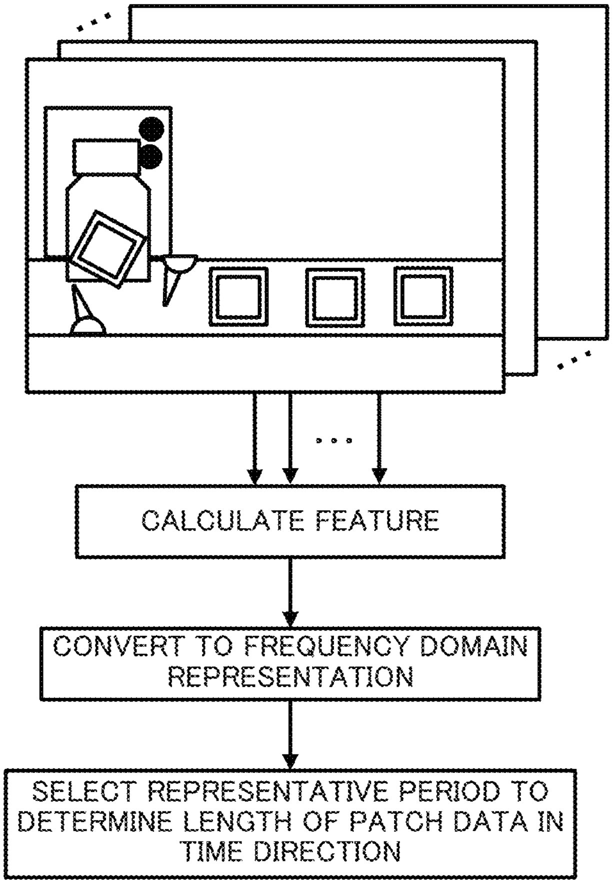
FIG. 6 is a diagram illustrating determination of a patch time length in Embodiment 1.

As illustrated in FIG. 6, the patch time length is determined by selecting a representative period from the frequency domain representation for the trend of the image feature varying along the time axis. The image feature for determining the patch time length may be the same as or different from the image feature for determining the patch size. The image feature for determining the patch time length may be a single value for each image. The frequency domain representation may be acquired through the fourier transform, the wavelet transform, or any other transform. The representative period may correspond to peaks in the frequency domain representation, or may be selected with another method.

The image feature for determining the patch time length corresponds to an example of a third feature. The parameter determiner 12 corresponds to an example of parameter-determination means for selecting a period from the frequency domain representation for a trend of the third feature calculated based on the images to determine the parameter indicating a length of each of the pieces of patch data in the time direction.

The divider 13 is mainly implemented by the processor 101 and the main storage 102 operating in cooperation with each other. The divider 13 divides the continuous image data using the parameters determined by the parameter determiner 12 to generate a set of patch data including multiple pieces of patch data. The generated set of patch data is output to the feature calculator 14.

The feature calculator 14 is mainly implemented by the processor 101 and the main storage 102 operating in cooperation with each other. The feature calculator 14 calculates the feature for each patch data piece to generate a set of feature data including the multiple calculated features. Examples of the feature include at least one of an optical flow, a HOG feature, a KAZE feature, or a learning-based feature calculated with deep learning. The feature may be a single type of feature or multiple types of features being combined. Each patch data piece may have a different type of feature or a different combination of features. The feature calculated by the feature calculator 14 corresponds to an example of a first feature. The feature calculator 14 in the abnormality detection device 100 corresponds to an example of feature calculation means for calculating a first feature for each of pieces of patch data resulting from division of the continuous image data using the parameters determined by the parameter-determination means.

The detector 15 is mainly implemented by the processor 101, the main storage 102, and the auxiliary storage 103 operating in cooperation with each other. The detector 15 in the abnormality detection device 100 corresponds to an example of detection means for detecting an abnormality in the capturing target captured in the images based on a comparison between the first feature calculated by the feature calculation means and a reference value. The detector 15 includes a difference calculator 151 for calculating a degree of difference by comparing the feature with the reference value, a reference feature storage 152 for storing a reference feature as the reference value, a determiner 153 for determining whether the degree of difference exceeds a threshold to determine whether any abnormality is present, and a threshold setter 154 for setting the threshold for the determination.

The difference calculator 151 compares each feature included in the set of feature data with the reference feature, and calculates the degree of difference between these two features for each patch data piece to generate a set of difference data including the multiple calculated degrees of difference. The degree of difference may be a degree of similarity such as histogram similarity or cosine similarity, a feature distance such as a Euclidean distance, a Manhattan distance, a Chebyshev distance, or an Mahalanobis distance, or a feature calculated with deep learning such as a Siamese network. The reference feature may vary with the position of each patch data piece in the images. The difference calculator 151 in the abnormality detection device 100 corresponds to an example of calculation means for calculating a degree of difference between the first feature and the reference value for each of the pieces of patch data.

The reference feature storage 152 prestores a set of reference feature data as a set of reference features. The reference feature is precalculated based on each patch data piece resulting from division of the continuous image data about the capturing target in a normal operating state being captured. The reference feature storage 152 stores the set of reference feature data generated for at least one combination of the patch size and the patch time length and may also store the set of reference feature data generated for multiple different combinations of the patch size and the patch time length. The set of reference feature data supplied from the reference feature storage 152 to the difference calculator 151 may be pre-generated for the patch size and the patch time length of each patch data piece acquired by the divider 13.

The determiner 153 compares each degree of difference included in the set of difference data with the threshold provided from the threshold setter 154 and determines whether the corresponding degree of difference exceeds the threshold to determine whether any abnormality is present. The determiner 153 generates a set of determination result data for each patch data piece. An abnormality is determined to be present based on a predetermined condition. More specifically, an abnormality may be determined to be present when the degree of difference is greater than the threshold or when the degree of similarity (corresponding to the degree of difference) is smaller than the threshold. The threshold to be compared with the degree of difference may vary with the position of the corresponding patch data piece in the images. The comparison between the degree of difference and the threshold may be performed for each patch data piece at a different position in the images. The determiner 153 in the abnormality detection device 100 corresponds to an example of determination means for determining whether the degree of difference calculated by the calculation means exceeds a threshold.

The threshold setter 154 is used for setting a set of threshold data as a set of predetermined thresholds for each patch data piece. The set of threshold data may be set by the user, or may be calculated as a statistic of features for positional or temporal partial data in the images of the continuous image data as an abnormality detection target. Examples of the feature may include an optical flow, a HOG feature, a KAZE feature, or a deep learning-based feature. The statistic of features may be calculated based on, for example, the mean, median, mode, variance, standard deviation, and maximum and minimum values of the features.

The output device 16 is mainly implemented by the output device 105. The output device 16 notifies the user of the result of abnormality detection performed by the detector 15.

Figure 7:
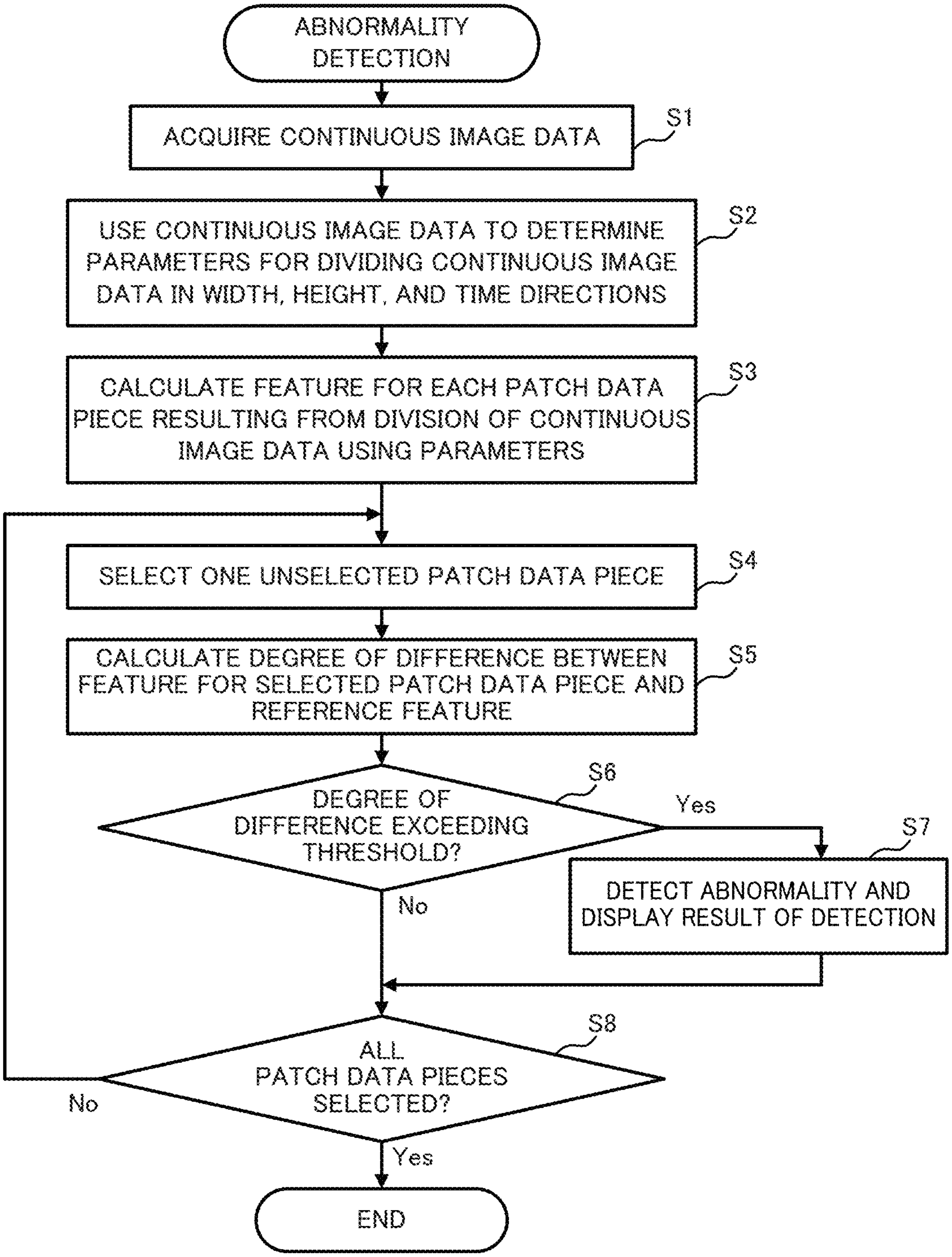
FIG. 7 is a flowchart of abnormality detection in Embodiment 1.

Abnormality detection performed by the abnormality detection device 100 is described with reference to FIG. 7. The user performing a specific operation on the abnormality detection device 100 triggers the start of abnormality detection. The specific operation may be, for example, an operation on the hardware switch or execution of specific application software. The abnormality detection corresponds to an example of an abnormality detection method performed by the abnormality detection device 100.

In abnormality detection, the acquirer 11 acquires the continuous image data (step S1). The acquirer 11 may acquire the continuous image data from the imaging device 200, or may read the continuous image data 30 by referring to an address in the auxiliary storage 103 specified by the user, a removable non-transitory recording medium such as a memory card, or an external server device.

Subsequently, the parameter determiner 12 determines, based on the continuous image data, the parameters for dividing the continuous image data in the width direction, the height direction, and the time direction (step S2). The parameters may substantially indicate the size of each patch data piece in the width direction, the height direction, and the time direction. For example, the parameters may indicate the position of a boundary with a bold line for dividing the continuous image data 30 illustrated in FIG. 3, or may indicate the number of divisions of the continuous image data 30 to be equally divided. The determined parameters are used by the divider 13 for dividing the continuous image data. Thus, multiple pieces of patch data are prepared.

Subsequently, the feature calculator 14 calculates the feature for each patch data piece resulting from division of the continuous image data using the parameters (step S3). Thus, as many features as the patch data pieces are calculated.

Subsequently, the detector 15 selects one unselected patch data piece (step S4). The unselected patch data piece may be selected with any method. For example, a patch data piece with predetermined coordinate values in the width direction, in the height direction, and in the time direction being smaller in this order as illustrated in FIG. 3 is selected preferentially.

Subsequently, the difference calculator 151 in the detector 15 calculates the degree of difference between the feature calculated in step S3 for the selected patch data piece (selected in step S4) and the reference feature read from the reference feature storage 152 (step S5).

Subsequently, the determiner 153 in the detector 15 determines whether the degree of difference calculated in step S5 exceeds the threshold set by the threshold setter 154 (step S6). When the degree of similarity indicating the level of similarity between the features is used instead of the degree of difference, the determiner 153 may determine whether the degree of similarity is below the threshold in step S6.

Figure 8:
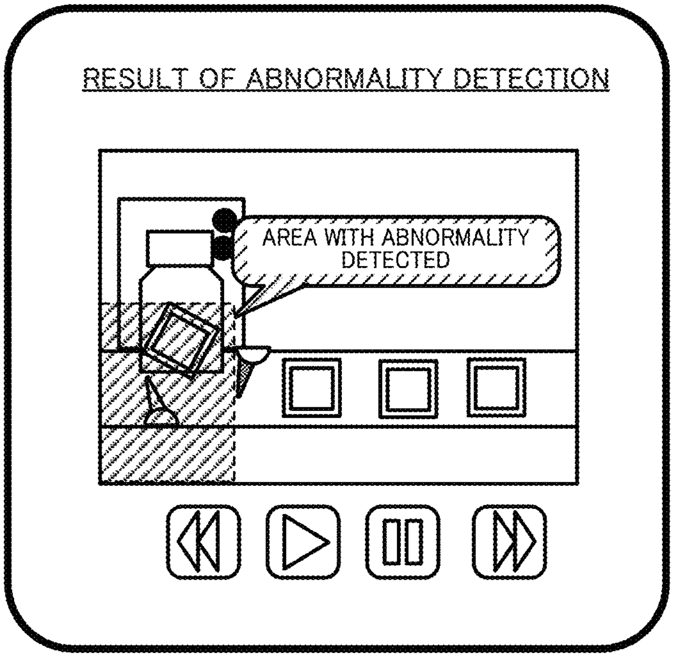
FIG. 8 is a diagram of an example screen illustrating a result of abnormality detection in Embodiment 1.

Upon determination that the degree of difference exceeds the threshold (Yes in step S6), the detector 15 detects an abnormality, and the output device 16 displays the result of detection (step S7). As illustrated in FIG. 8, for example, the output device 16 displays a screen highlighting areas corresponding to the patch data with the abnormality detected.

Upon determination that the degree of difference does not exceed the threshold (No in step S6) or when step S7 is complete, the detector 15 determines whether all pieces of patch data resulting from division of the continuous image data have been selected (step S8). Upon determination that not all the pieces of patch data have been selected (No in step S8), step S4 and the subsequent steps are repeated. Upon determination that all the pieces of patch data have been selected (Yes in step S8), the abnormality detection is complete.

Upon completion of abnormality detection for the current piece of continuous image data, abnormality detection may be performed for the next piece of continuous image data, and such processing may be repeated without the abnormality detection being ended. The abnormality detection in FIG. 7 is merely an example, and the order of the abnormality detection steps may be changed as appropriate. For example, instead of performing steps S5 to S7 for the selected piece of patch data, when the degree of difference has been calculated for all the pieces of patch data and when the comparison between each of these degrees of difference and the threshold has been performed, the result of abnormality detection may be displayed.

As described above, the parameter determiner 12 in the present embodiment determines, based on the continuous image data, the parameters for dividing the continuous image data in the width direction, the height direction, and the time direction of the images. This eliminates the user operation of determining the parameters for dividing the continuous image data through trial and error. Thus, the user has a less workload of setting parameters for devices detecting abnormalities based on images.

Further, appropriate parameters can be set more quickly, thus reducing time for preparing to operate the abnormality detection device 100. An inappropriate parameter set by the user may not allow accurate detection of abnormalities, whereas the abnormality detection device 100 according to the present embodiment is expected to accurately detect abnormalities. This allows an unknowledgeable or inexperienced user to accurately and easily detect abnormalities.

The parameter determiner 12 detects the blob areas and determines the patch size for causing the corresponding patch data piece to include the selected one of the detected blob areas. Determining the set of partial areas having the similar features as the patch size can avoid patch sizes being inappropriately smaller.

The parameter determiner 12 also selects a period from the frequency domain representation for the trend of the features to determine the patch time length. This structure avoids determining an inappropriately long patch time length.

Embodiment 2

Embodiment 2 is described focusing on the differences from Embodiment 1. The same reference signs denote the components that are the same as or similar to those in Embodiment 1. The present embodiment differs from Embodiment 1 in that continuous image data is compressed to reduce an operational amount.

Figure 9:
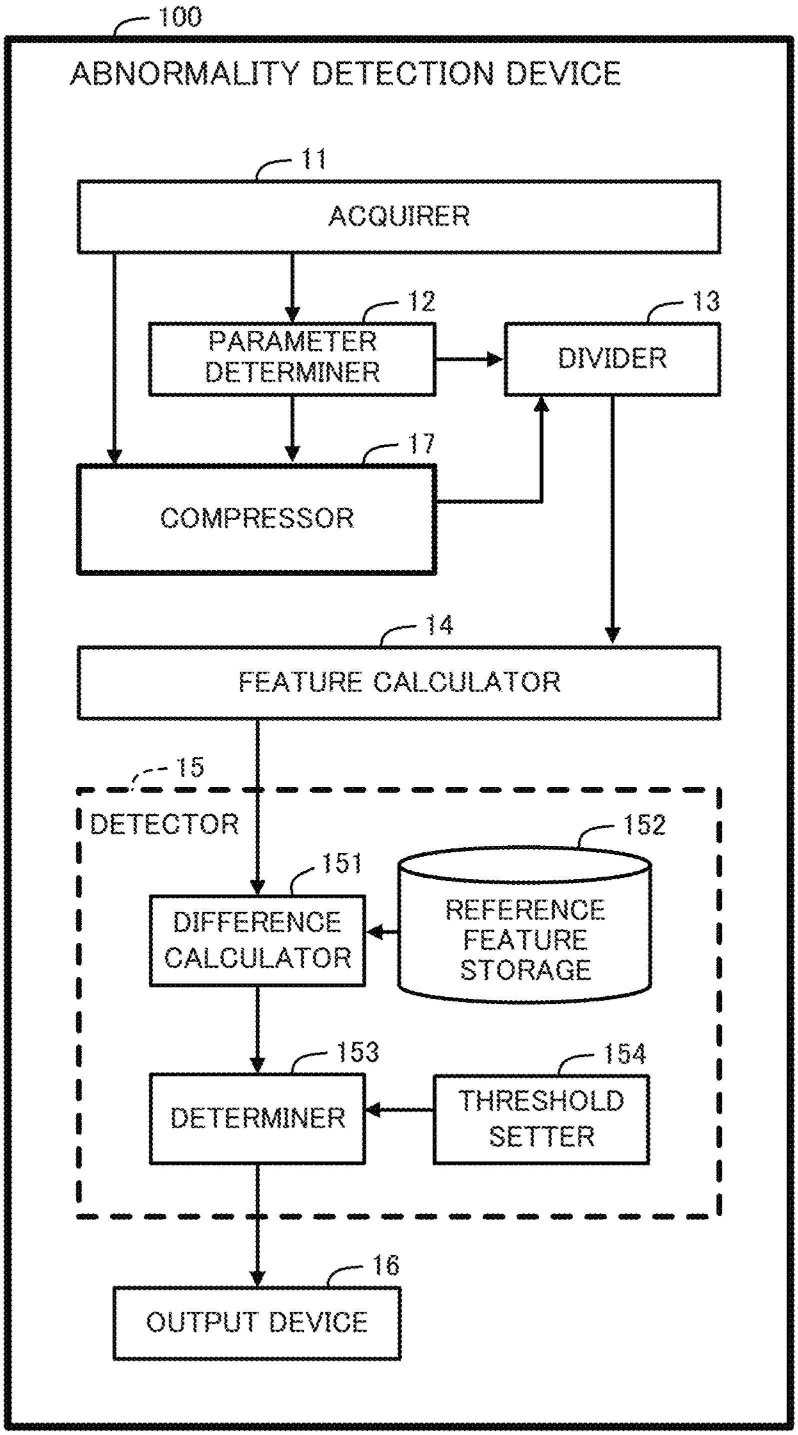
FIG. 9 is a functional block diagram of an abnormality detection device according to Embodiment 2.

As illustrated in FIG. 9, the abnormality detection device 100 according to the present embodiment includes a compressor 17 for reducing the image size and a frame rate to compress the continuous image data. The compressor 17 is mainly implemented by the processor 101 and the main storage 102 operating in cooperation with each other. The compressor 17 calculates compression parameters indicating intended compression of the continuous image data based on the continuous image data acquired by the acquirer 11 and the parameters determined by the parameter determiner 12. The compression parameters include an image reduction parameter for reducing the image size and a time reduction parameter for reducing the length of the continuous image data in the time direction.

More specifically, the compressor 17 reduces the features for the partial areas used to calculate the patch size, and calculates the image reduction parameter for reducing the image size within a range to avoid any effects such as changes in the shape of the blob areas calculated based on the features or loss of the blob areas. For example, the compressor 17 repeatedly detects each blob area while increasing the reduction rate for the image size and determines the reduction rate immediately before the loss of the corresponding blob area as the image reduction parameter.

The compressor 17 calculates the maximum speed in the continuous image data based on the optical flow and sets the time reduction parameter such that the frame rate is greater than or equal to the maximum speed. For example, the compressor 17 selects the maximum speed within the speed range indicated by the optical flow, and calculates the time reduction parameter for reducing the length of the continuous image data in the time direction within a range to avoid loss of the optical flow corresponding to the maximum speed.

The compressor 17 compresses the continuous image data using the calculated compression parameters, and outputs the compressed continuous image data to the divider 13. The divider 13 divides the compressed continuous image data into multiple pieces of patch data. The feature calculator 14 calculates the feature for each patch data piece resulting from division of the compressed continuous image data.

Figure 10:
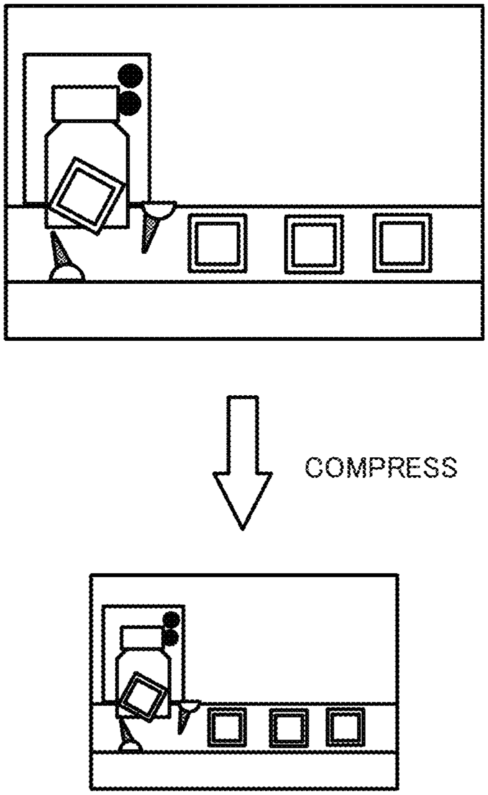
FIG. 10 is a diagram describing compression of continuous image data in Embodiment 2.

As described above, the compressor 17 compresses the continuous image data based on the sizes of the blob areas, and the feature calculator 14 calculates the feature for each patch data piece resulting from division of the continuous image data compressed by the compressor 17. Directly processing the continuous image data output from the acquirer 11 is time-consuming. The processing described above reduces the image size and the frame rate to avoid any effects on the detection of abnormalities and compresses the continuous image data to reduce the processing time as illustrated in FIG. 10.

In the example described above, the compressor 17 reduces the image size and the frame rate. In some embodiments, the compressor 17 may reduce either the image size or the frame rate. The compressor 17 may compress the image size in either the width direction or the height direction of the images. The compressor 17 may compress, based on the sizes of the blob areas, the continuous image data in at least one of the width direction or the height direction of the images. The compressor 17 in the abnormality detection device 100 corresponds to an example of compression means for compressing the continuous image data in at least one of the width direction or the height direction of the images based on sizes of the blob areas.

In the example described above, the compressor 17 is additionally located between the acquirer 11 and the divider 13 in Embodiment 1, but may be located differently. For example, the compressor 17 may be between the divider 13 and the feature calculator 14 to compress each patch data piece.

Embodiment 3

Embodiment 3 is described focusing on the differences from Embodiment 1. The same reference signs denote the components that are the same as or similar to those in Embodiment 1. The present embodiment differs from Embodiment 1 in that the parameters for dividing the continuous image data are determined based on detection of an object captured in the images instead of the image features.

Figure 11:
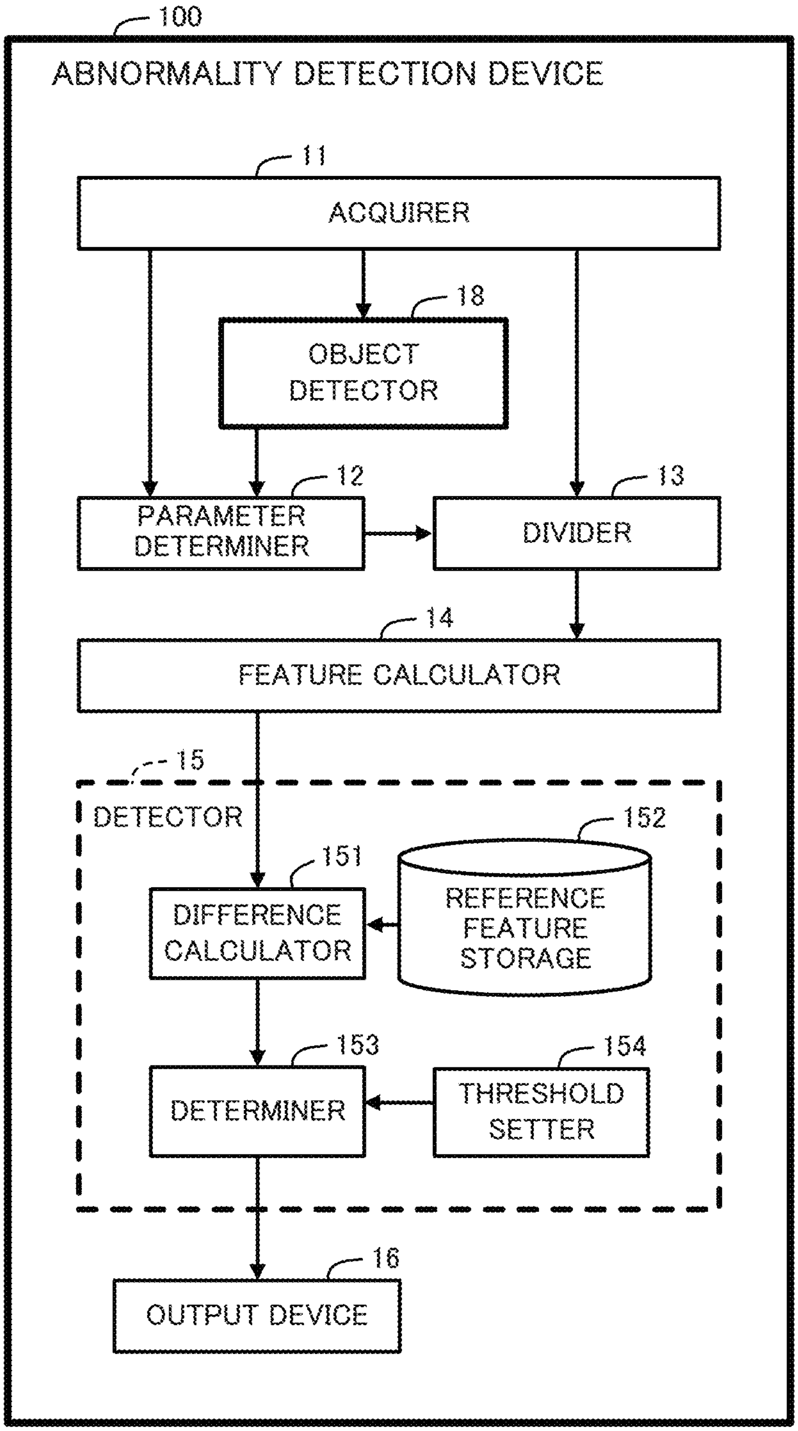
FIG. 11 is a functional block diagram of an abnormality detection device according to Embodiment 3.
Figure 12:
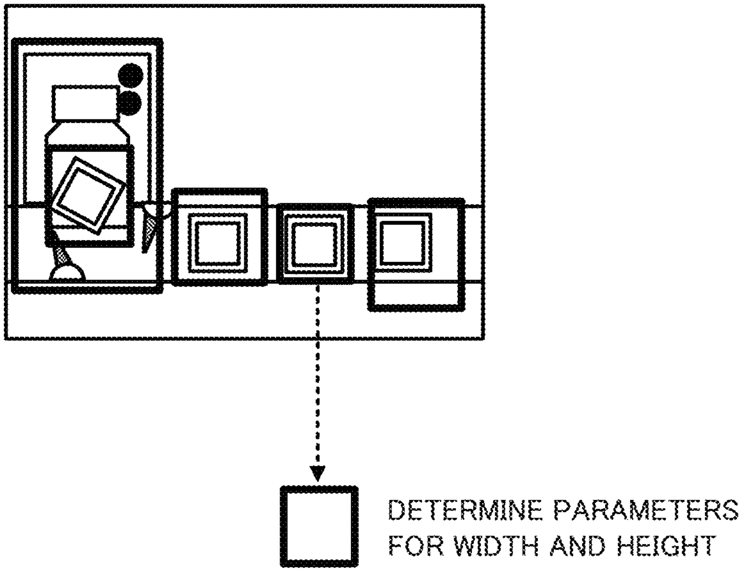
FIG. 12 is a diagram describing determination of a patch size based on a result of object detection in Embodiment 3.

The abnormality detection device 100 according to the present embodiment includes an object detector 18 for detecting an object captured in the images as illustrated in FIG. 11. The object detector 18 is mainly implemented by the processor 101 and the main storage 102 operating in cooperation with each other. The object detector 18 detects objects in each image in the continuous image data as illustrated with bold frame lines in FIG. 12, and outputs a set of detection result data indicating all the detected objects to the parameter determiner 12.

The objects are detected with a method based on features such as a Haar-like feature and a HOG feature, or with a deep learning-based method such as a you only look once (YOLO) algorithm or a single shot multi-box detector (SSD) algorithm. The result of detection indicates the coordinates of the detected object in the images, together with the size of an area in which the detected object is captured, including the width and the height of the area. The result of detection may further include classified class information, the degree of reliability, and other information. The object detector 18 in the abnormality detection device 100 corresponds to an example of object detection means for detecting an object captured in the images.

The parameter determiner 12 acquires the continuous image data and the set of detection result data to determine the parameters for dividing the continuous image data. For example, the parameter determiner 12 determines the minimum size or the average size of all the detected objects as the patch size.

As described above, the abnormality detection device 100 includes the object detector 18, and the parameter determiner 12 determines the parameters indicating the width and the height of the patch data based on the size of the area in the images in which the object detected by the object detector 18 is captured. In this case, the patch size is determined based on the size of the object captured actually in the images to accurately detect abnormalities.

Embodiment 4

Embodiment 4 is described focusing on the differences from Embodiment 3. The same reference signs denote the components that are the same as or similar to those in Embodiment 3. The present embodiment differs from Embodiment 3 in that the continuous image data is compressed to reduce an operational amount.

Figure 13:
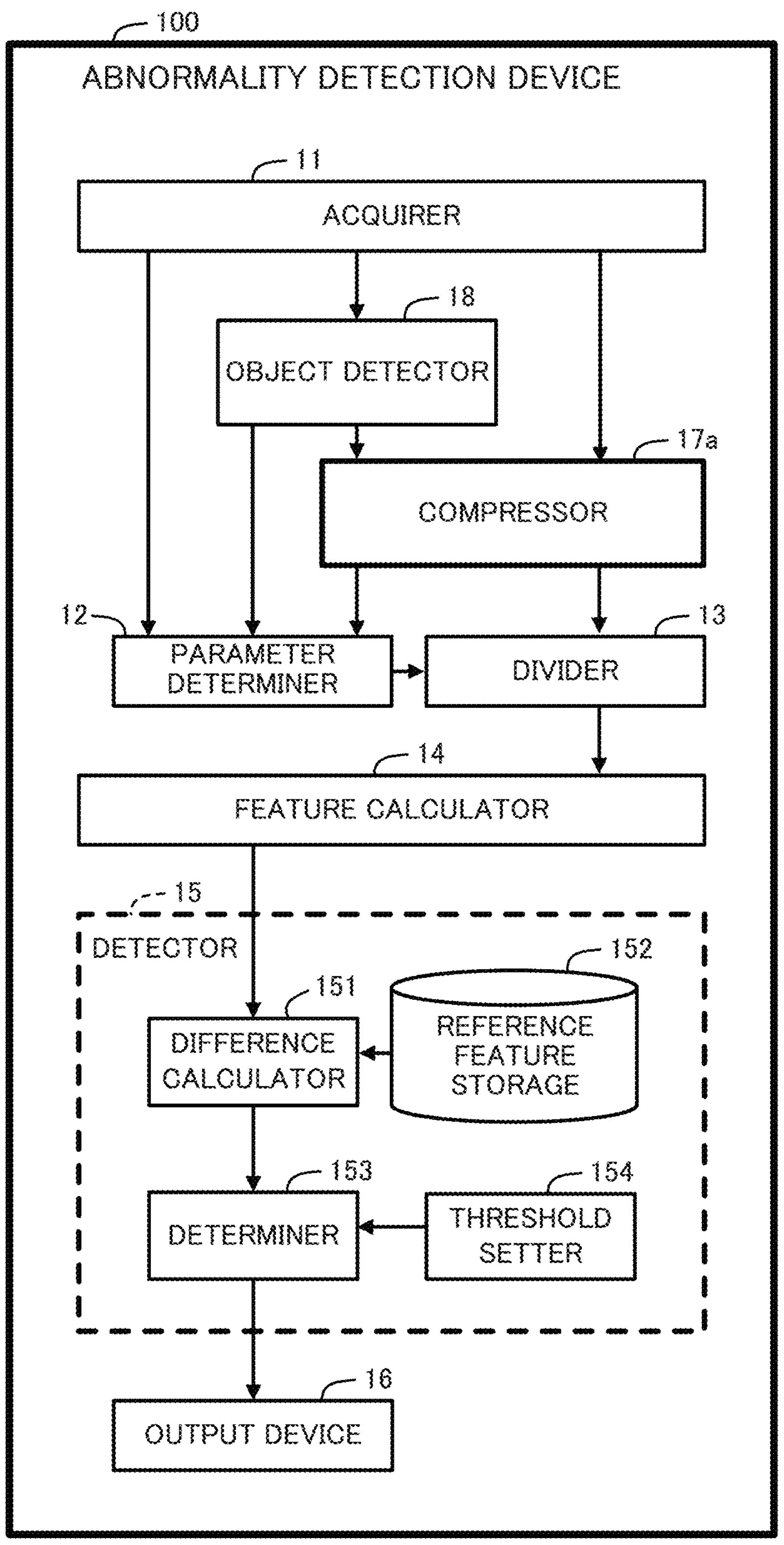
FIG. 13 is a functional block diagram of an abnormality detection device according to Embodiment 4.

As illustrated in FIG. 13, the abnormality detection device 100 according to the present embodiment includes a compressor 17*a* for reducing the image size to compress the continuous image data. The compressor 17*a* is mainly implemented by the processor 101 and the main storage 102 operating in cooperation with each other. The compressor 17*a* calculates a compression parameter indicating intended compression of the images in the continuous image data based on the result of detection performed by the object detector 18.

More specifically, the compressor 17*a* calculates the compression parameter based on the correction image size acquired by multiplying, by a predetermined coefficient, the inverse of the pixel for an area in which the smallest one of the objects detected by the object detector 18 is captured. The ratio of the size of an uncompressed image to the corrected image size serves as the compression parameter.

The compressor 17*a* in the abnormality detection device 100 corresponds to an example of compression means for compressing the continuous image data based on the size of the area in the images in which the object detected by the object detection means is captured. The compressor 17*a* outputs, to the divider 13, the continuous image data compressed using the determined compression parameter. The divider 13 divides the compressed continuous image data. The feature calculator 14 calculates the feature for each patch data piece resulting from division of the compressed continuous image data.

As described above, the abnormality detection device 100 includes the compressor 17*a*, and the feature calculator 14 calculates the feature for each patch data piece resulting from division of the continuous image data compressed by the compressor 17*a*. This reduces the operational amount in the abnormality detection device 100.

The compressor 17*a* may reduce one or both of the width and the height of the images. The compressor 17*a* may compress the continuous image data in at least one of the width direction or the height direction of the images.

Embodiment 5

Embodiment 5 is described focusing on the differences from Embodiment 3. The same reference signs denote the components that are the same as or similar to those in Embodiment 3. The present embodiment differs from Embodiment 3 in that an object moving over time is detected and tracked on the images, and the parameter is determined based on the result of object tracking.

Figure 14:
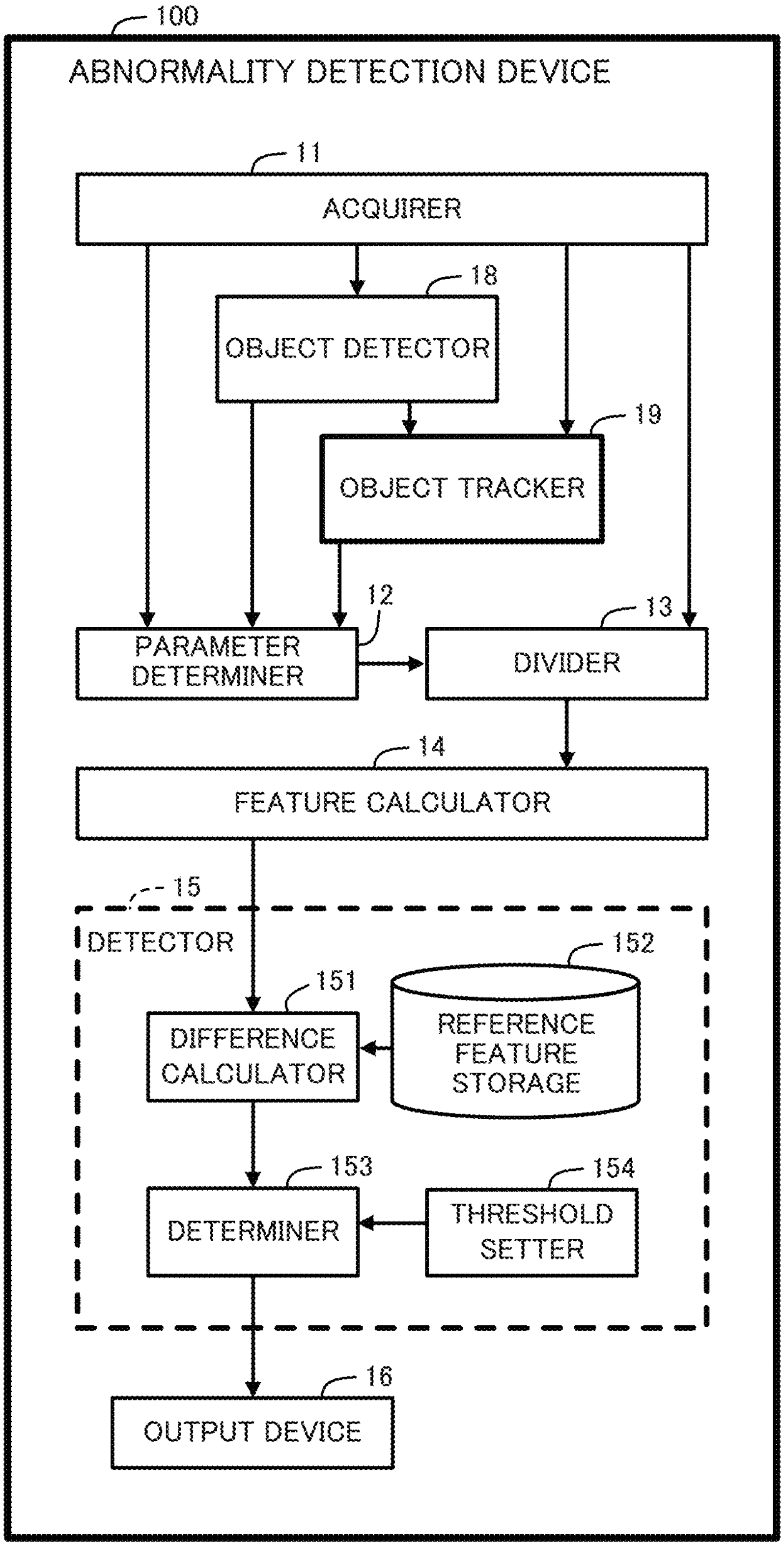
FIG. 14 is a functional block diagram of an abnormality detection device according to Embodiment 5.

The abnormality detection device 100 according to the present embodiment includes an object tracker 19 for tracking objects captured in the images as illustrated in FIG. 14. The object tracker 19 is mainly implemented by the processor 101 and the main storage 102 operating in cooperation with each other. The object tracker 19 tracks objects based on the continuous image data and the result of detection of the objects and outputs a set of tracking result data indicating the result of tracking all the objects.

The objects may be tracked with a detection-based tracking method using a k-nearest neighbor algorithm, a particle filter or a template matching method using the first detected position of an object as the initial position, or another method. The object tracker 19 in the abnormality detection device 100 corresponds to an example of object tracking means for tracking an object captured in the images continuously captured.

The parameter determiner 12 acquires the continuous image data, the results of detection of the objects, and the results of tracking the objects to determine the parameter for dividing the continuous image data. More specifically, the parameter determiner 12 determines, as the patch time length, the length of time during which the object tracked over the longest period is captured in the images.

The parameter determiner 12 may also determine, as the patch time length, the length of time from when an object appears in an image block as the patch data until when the object disappears from the image block. The image block corresponds to a partial image divided based on the patch size from the images included in the continuous image data. The parameter determiner 12 may also calculate Pt as the patch time length based on the formula $Pt=\alpha\cdot|Vmin|/Mmax$, where Vmin is the minimum speed of the tracked object, Mmax is the preset maximum capturing distance, and $\alpha$ is the predetermined coefficient.

As described above, the abnormality detection device 100 includes the object tracker 19, and the parameter determiner 12 determines, based on the result from the object tracker 19 tracking the objects, the parameter including the patch time length indicating the length of the patch data in the time direction. In this case, the patch data includes the image block including the captured object and thus, abnormalities related to the objects are accurately detected. The parameter determiner 12 corresponds to an example of parameter-determination means for determining the parameter indicating a length of each patch data piece in the time direction based on speed at which the object tracked by the object tracking means moves in the images.

Embodiment 6

Embodiment 6 is described focusing on the differences from Embodiment 5. The same reference signs denote the components that are the same as or similar to those in Embodiment 5. The present embodiment differs from Embodiment 5 in that the continuous image data is compressed to reduce an operational amount.

Figure 15:
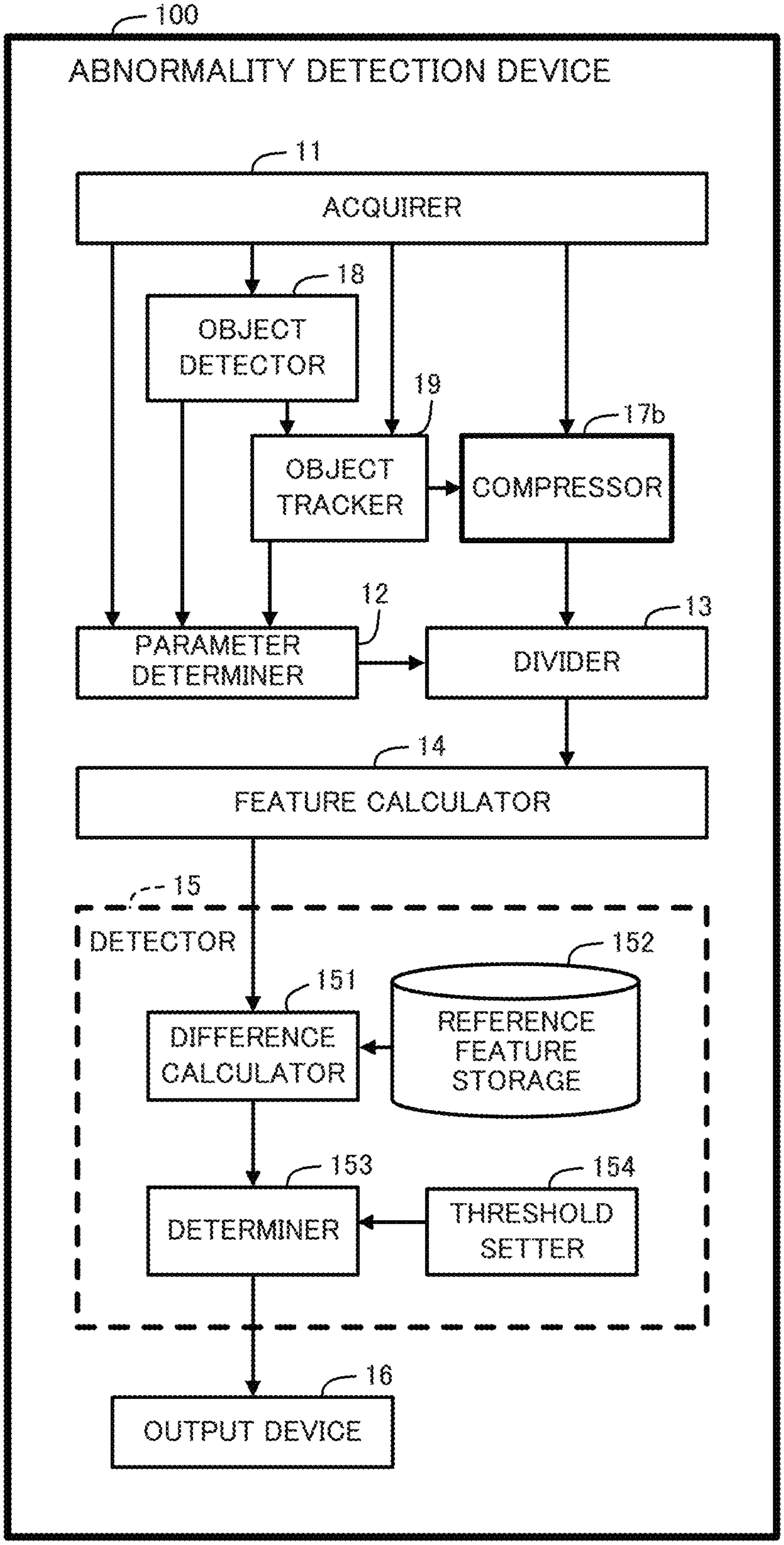
FIG. 15 is a functional block diagram of an abnormality detection device according to Embodiment 6.

The abnormality detection device 100 according to the present embodiment includes a compressor 17*b* for reducing the frame rate to compress the continuous image data as illustrated in FIG. 15. The compressor 17*b* is mainly implemented by the processor 101 and the main storage 102 operating in cooperation with each other. The compressor 17*b* calculates a compression parameter indicating intended reduction of the length of the continuous image data in the time direction based on the result from the object tracker 19 tracking an object.

More specifically, the compressor 17*b* calculates a correction frame rate based on the length of the correction time acquired by multiplying, by a predetermined coefficient, the shortest length of time during which the tracked object is captured in each image. The compressor 17*b* then calculates the compression parameter based on the frame rate for uncompressed continuous image data and the correction frame rate. The correction frame rate is the inverse of the correction time. The length of the correction time may be acquired by multiplying, by a predetermined coefficient, the length of time from when the object appears in the image block as the patch data until when the object disappears from the image block.

The compressor 17*b* in the abnormality detection device 100 corresponds to an example of compression means for compressing the continuous image data in the time direction based on a length of time during which the object tracked by the object tracking means is captured in the images. The compressor 17*b* outputs, to the divider 13, the continuous image data compressed using the determined compression parameter. The divider 13 divides the compressed continuous image data. The feature calculator 14 calculates the feature for each patch data piece resulting from division of the compressed continuous image data.

As described above, the abnormality detection device 100 includes the compressor 17*b*, and the feature calculator 14 calculates the feature for each patch data piece resulting from division of the continuous image data compressed by the compressor 17*b*. This reduces the operational amount in the abnormality detection device 100.

Embodiment 7

Embodiment 7 is described focusing on the differences from Embodiment 1. The same reference signs denote the components that are the same as or similar to those in Embodiment 1. In Embodiment 1, each patch data piece has a common patch size. In other words, the parameter determiner 12 determines a set of parameters indicating the width and the height of the patch data. In contrast, the present embodiment differs from Embodiment 1 in that the parameter determiner 12 determines, as the parameters, the patch size varying with the position of each patch data piece in the images.

Figure 16:
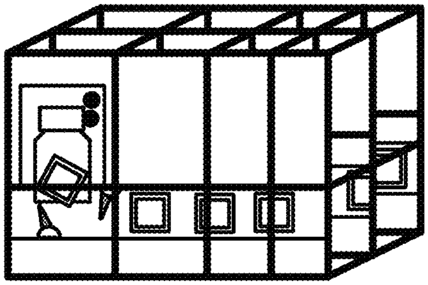
FIG. 16 is a diagram describing determination of a patch size in Embodiment 7.

As illustrated in FIG. 16, the parameter determiner 12 in the present embodiment determines the parameters for each patch data piece with the patch size varying with the position of the corresponding patch data piece in the images and outputs a set of parameter data indicating the patch size for each of all the pieces of patch data. The set of parameter data indicates the patch size for each patch data piece in association with the position of the corresponding patch data piece in the images. The patch size may vary for one or both of the horizontal direction as the width of the images and the vertical direction as the height of the images. In other words, a common parameter value may be determined for each patch data piece in the horizontal direction or in the vertical direction.

As described above, the parameters determined by the parameter determiner 12 include the parameter indicating at least one of the width or the height of one patch data piece with a value different from the value of the parameter for another patch data piece at a position different from the position of the one patch data piece in the images. In this case, each patch data piece is generated based on the size of the capturing target in the images to accurately detect abnormalities.

For example, with the modification of Embodiment 1 used in the present embodiment combined with Embodiment 3, the patch size may be determined based on the position and the size of the object detected by the object detector 18. With the above modification combined with Embodiment 5, the patch size may be determined such that the corresponding patch data piece includes any possible number of objects tracked by the object tracker 19. The user may set the position of each patch data piece having the determined size in the images.

Although one or more embodiments of the present disclosure have been described above, the present disclosure is not limited to the above embodiments.

For example, the continuous image data is divided in the width direction and the height direction of the images in the above example, but may be divided differently. The parameter determiner 12 may determine, based on the continuous image data, the parameters for dividing the continuous image data in at least one of the width direction or the height direction of the images and in the time direction.

Figure 17:
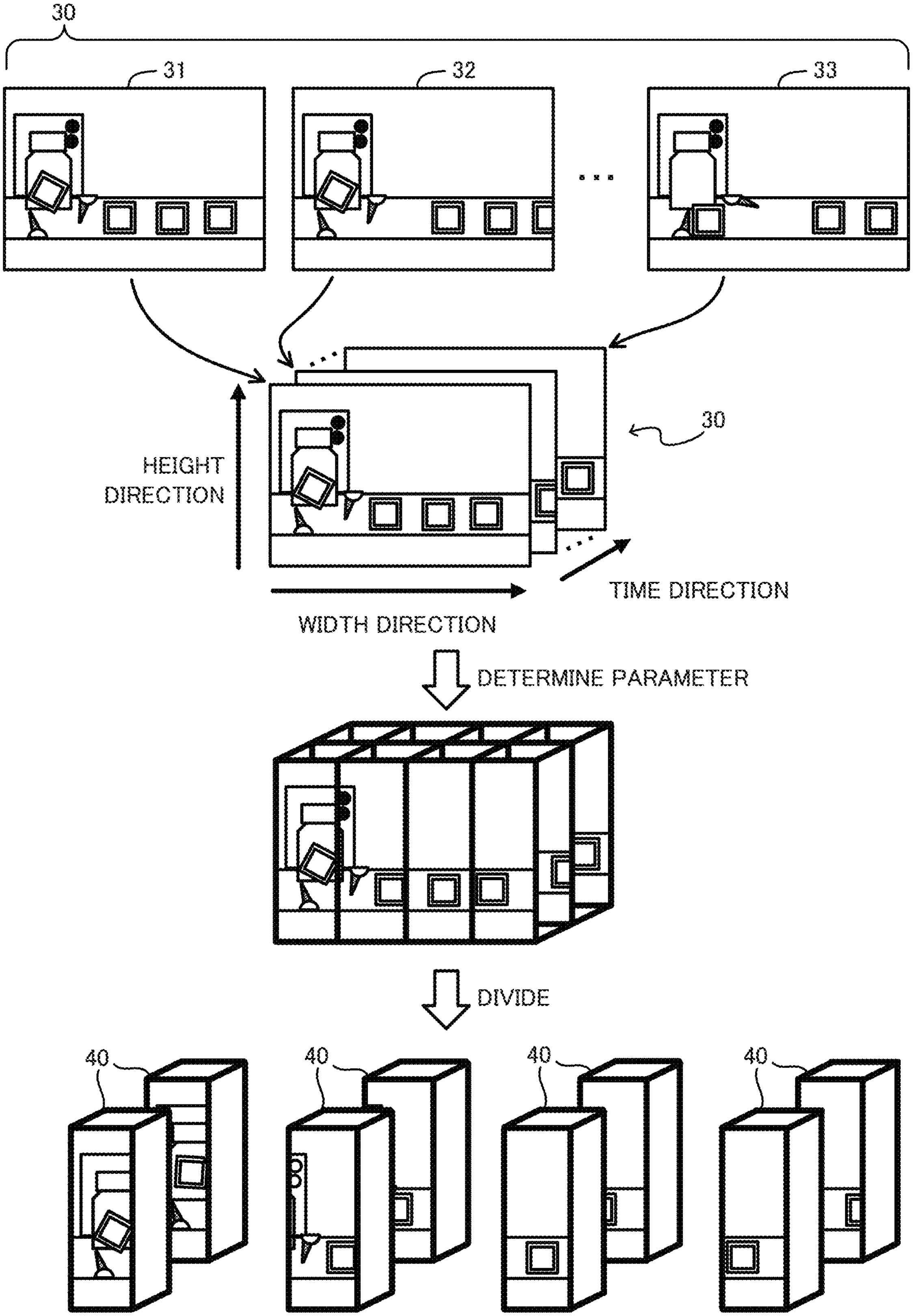
FIG. 17 is a diagram describing division of continuous image data in Modification 1.

More specifically, as illustrated in FIG. 17, the abnormality detection device 100 may divide the continuous image data not in the height direction but in the width direction and the time direction to acquire the patch data pieces 40. When the continuous image data is not divided in the height direction as illustrated in the example of FIG. 17, the parameter for dividing the continuous image data in the height direction may not be determined, and thus the continuous image data may not be divided in the height direction based on the parameter in each embodiment described above. When, for example, subjects captured in the images are aligned in the width direction but not in the height direction, and when the subjects move in the width direction but not in the height direction, the continuous image data may not be divided in the height direction. Thus, the abnormality detection device 100 has a less calculation load.

Figure 18:
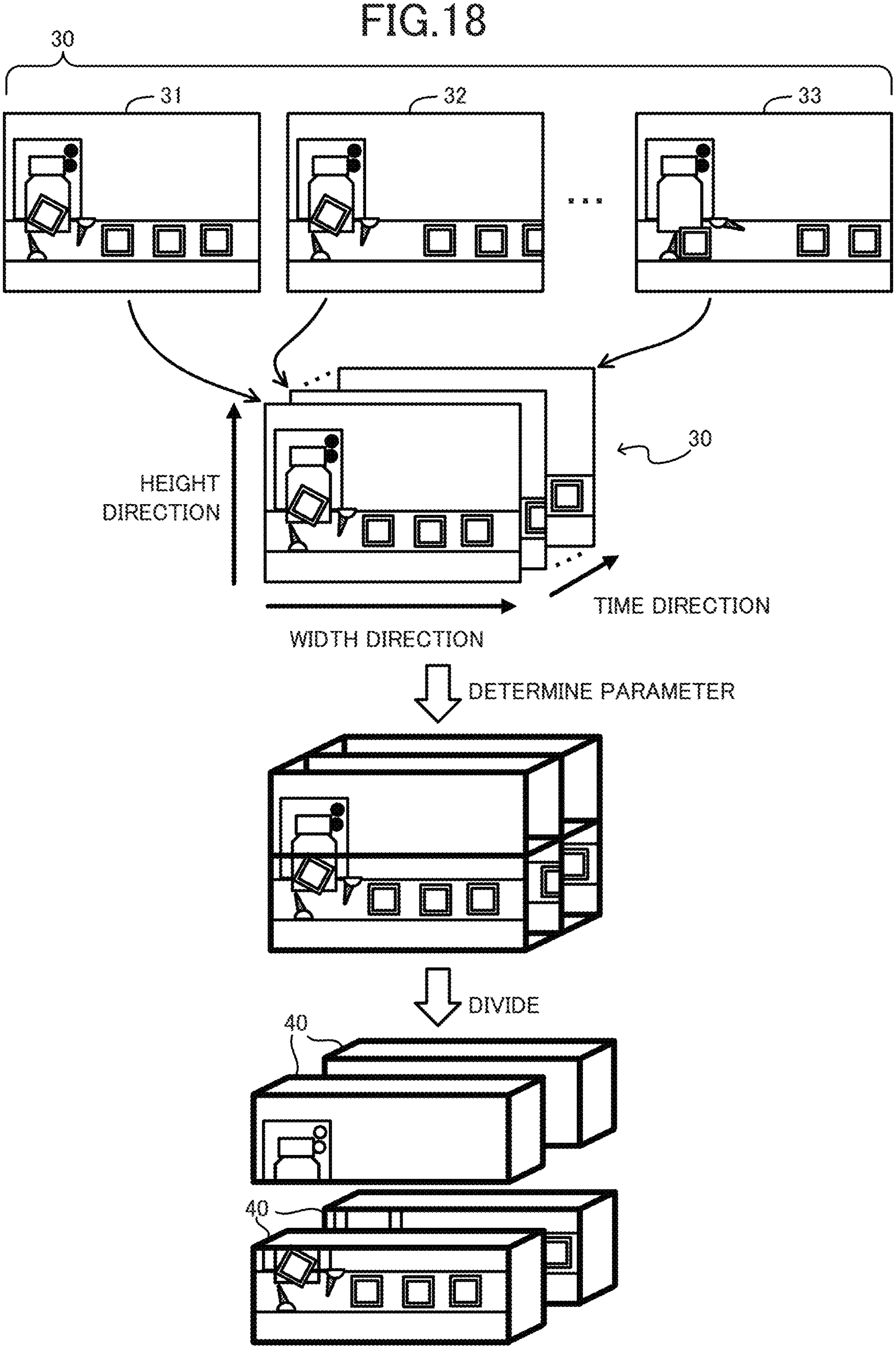
FIG. 18 is a diagram describing division of continuous image data in Modification 2.

As illustrated in FIG. 18, the abnormality detection device 100 may divide the continuous image data not in the width direction but in the height direction and the time direction to acquire the patch data pieces 40. When the continuous image data is not divided in the width direction, the parameter for dividing the continuous image data in the width direction may not be determined, and thus the continuous image data may not be divided in the width direction based on the parameter in each embodiment described above. When, for example, subjects captured in the images are aligned in the height direction but not in the width direction, the continuous image data may not be divided in the width direction. Thus, the abnormality detection device 100 has a less calculation load.

The parameter determiner 12 determines the parameters with the method described in each embodiment above, but may determine the parameters with a different method.

As illustrated in FIG. 3, each patch data piece does not overlap another patch data piece in the above examples. In some embodiments, some patch data pieces may overlap each other. For example, the continuous image data may be divided into partial data pieces as illustrated in FIG. 3, and margins may be set for the partial data pieces to produce patch data pieces. At least a part of each patch data piece may be at a different position from another patch data piece in the images or in the time direction, or both.

A compressor may be located to compress the continuous image data in a different manner from the compressors 17, 17*a*, and 17*b* described in Embodiment 2, 4, and 6. For example, the abnormality detection may be performed for uncompressed continuous image data, and abnormality detection may be performed again for compressed continuous image data. The parameters for compressing the continuous image data may be determined within a range to avoid any effects on the detection accuracy. More specifically, the compression parameters may be determined to allow fluctuations in the detection accuracy to fall within a preset threshold.

Each embodiment above may be combined as appropriate. For example, the compressor 17 in Embodiment 2 and the compressor 17*b* in Embodiment 6 may both be included in the abnormality detection device 100.

The functions of the abnormality detection device 100 according to the above embodiments can be implemented by dedicated hardware or a general-purpose computer system.

For example, the program P1 may be stored in a non-transitory computer-readable recording medium such as a flexible disc, a compact disc read-only memory (CD-ROM), a digital versatile disc (DVD), or a magneto-optical (MO) disk, for distribution. The program P1 may be installed on a computer to provide a device that performs the above processing.

The program P1 may be stored in a disk device included in a server on a communication network, such as the Internet, and may be, for example, superimposed on a carrier wave to be downloaded to a computer.

The above processing may also be performed by the program P1 activated and executed while being transferred through a network, such as the Internet.

The above processing may be performed by entirely or partially executing the program P1 on a server while a computer is transmitting and receiving information about the processing through a communication network.

In the system with the above functions implementable partially by the operating system (OS) or through cooperation between the OS and applications, portions executable by applications other than the OS may be stored in a non-transitory recording medium that may be distributed or may be downloaded to a computer.

Means for implementing the functions of the abnormality detection device 100 is not limited to software, and may be partially or entirely implemented by dedicated hardware or a dedicated circuit.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The structure according to one or more embodiments of the present disclosure may be used for abnormality detection based on images.

REFERENCE SIGNS LIST

- 100 Abnormality detection device
- 11 Acquirer
- 12 Parameter determiner
- 13 Divider
- 14 Feature calculator
- 15 Detector
- 151 Difference calculator
- 152 Reference feature storage
- 153 Determiner
- 154 Threshold setter
- 16 Output device
- 17, 17*a*, 17*b* Compressor
- 18 Object detector
- 19 Object tracker
- 101 Processor
- 102 Main storage
- 103 Auxiliary storage
- 104 Input device
- 105 Output device
- 106 Communicator
- 107 Internal bus
- 30 Continuous image data
- 31 to 33 Image

40 Patch data
200 Imaging device
P1 Program

The invention claimed is:

1. A non-transitory recording medium storing a program, the program causing the computer to perform operations comprising:

acquiring continuous image data indicating images continuously captured; and determining, based on the continuous image data, parameters for dividing the continuous image data in at least one of a width direction or a height direction of the images and in a time direction to obtain pieces of patch data, wherein the determining of the parameters includes calculating a second feature for each of partial areas included in the images and classifying the second feature to detect blob areas each being a set of adjacent partial areas of the partial areas, the adjacent partial areas each having the second feature classified into an identical group, and determining parameters indicating a width and a height of each of the pieces of patch data such that the piece of patch data includes a blob area selected from the detected blob areas.

2. The non-transitory recording medium according to claim 1, wherein the program causes the computer to perform operations comprising detecting an object captured in the images, and determining parameters indicating a width and a height of each of pieces of patch data based on a size of an area in the images in which the detected object is captured.

3. The non-transitory recording medium according to claim 2, wherein the program causes the computer to perform operations comprising compressing the continuous image data in at least one of the width direction or the height direction of the images based on the size of the area in the images in which the detected object is captured, calculating a first feature for each of the pieces of patch data resulting from division of the compressed continuous image data using the determined parameters, and detecting, based on a comparison between the calculated first feature and a reference value, an abnormality in a capturing target captured in the images.

4. The non-transitory recording medium according to claim 1, wherein the program causes the computer to perform operations comprising selecting a period from a frequency domain representation for a trend of a third feature calculated based on the images to determine a parameter indicating a length of each of the pieces of patch data in the time direction.

5. The non-transitory recording medium according to claim 1, wherein a parameter, of the determined parameters, indicating at least one of a width or a height of one of pieces of patch data has a value different from a value of the parameter for another of the pieces of patch data at a position different from a position of the one piece of patch data in the images.

6. The non-transitory recording medium according to claim 1, wherein the program causes the computer to perform operations comprising compressing the continuous image data in at least one of the width direction or the height direction of the images based on sizes of the blob areas, calculating a first feature for each of the pieces of patch data resulting from division of the compressed continuous image data using the determined parameters, and detecting, based on a comparison between the calculated first feature and a reference value, an abnormality in a capturing target captured in the images.

7. The non-transitory recording medium according to claim 1, wherein the program causes the computer to perform operations comprising calculating a first feature for each of pieces of patch data resulting from division of the continuous image data using the determined parameters, calculating a degree of difference between the first feature for each of the pieces of patch data and a reference value, determining whether the calculated degree of difference exceeds a threshold, and detecting an abnormality in a capturing target captured in the images when the degree of difference is determined to be exceeding the threshold.

8. The non-transitory recording medium according to claim 1 wherein the program causes the computer to perform operations comprising detecting, based on each of pieces of patch data resulting from division of the continuous image data using the determined parameters, an abnormality in a capturing target captured in the images.

9. The non-transitory recording medium according to claim 8, wherein the program causes the computer to perform operations comprising displaying a screen highlighting areas corresponding to the piece of patch data with the abnormality detected.

10. A non-transitory recording medium storing a program, the program causing a computer to perform operations comprising:

acquiring continuous image data indicating images continuously captured;

tracking an object captured in the images; and determining based on the continuous image data, parameters for dividing the continuous image data in at least one of a width direction or a height direction of the images and in a time direction to obtain pieces of patch data, wherein the determining of the parameters includes determining a parameter indicating a length of each of the pieces of patch data in the time direction based on speed at which the tracked object moves in the images.

11. The non-transitory recording medium according to claim 10, wherein the program causes the computer to perform operations comprising compressing the continuous image data in the time direction based on a length of time during which the tracked object is captured in the images, calculating a first feature for each of the pieces of patch data resulting from division of the compressed continuous image data using the determined parameters, and detecting, based on a comparison between the calculated first feature and a reference value, an abnormality in a capturing target captured in the images.

12. A non-transitory recording medium storing a program, the program causing a computer to perform operations comprising:

acquiring continuous image data indicating images continuously captured;

determining, based on the continuous image data, parameters for dividing the continuous image data in at least one of a width direction or a height direction of the images and in a time direction;

calculating a first feature for each of pieces of patch data resulting from division of the continuous image data using the determined parameters; and detecting, based on a comparison between the calculated first feature and a reference value, the abnormality in the capturing target.

* * * * *